H. Underwood,
Belt Fastener.

Nº 58,004. Patented Sep. 11, 1866.

Witnesses:

Inventor;
H. Underwood
Per Munn & Co.
Attorneys

UNITED STATES PATENT OFFICE.

HENRY UNDERWOOD, OF NEW YORK, N. Y.

IMPROVED LAP-JOINT FOR BELTING.

Specification forming part of Letters Patent No. 58,004, dated September 11, 1866.

*To all whom it may concern:*

Be it known that I, HENRY UNDERWOOD, of the city, county, and State of New York, have invented a new and useful Improvement in Lap-Joint for Belting; and I do hereby declare that the following is a full, clear, and exact description of the invention, which will enable others skilled in the art to make and use the same, reference being had to the accompanying drawings, forming part of this specification, in which—

Figure 1:
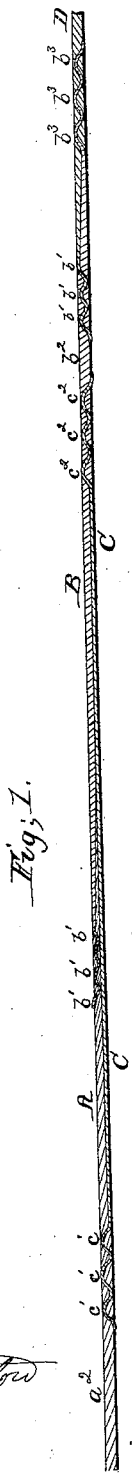
Figure 2:
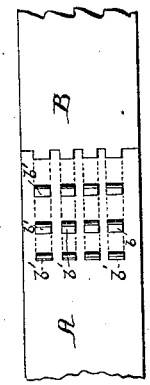

Figure 1 is a longitudinal section of a piece of belting showing my improved joints. Fig. 2 is a side view of a portion of the same.

Similar letters of reference indicate like parts.

It is well known that the part of a side of leather that was taken from the rump of the animal is the thickest and firmest; and that the part taken from the shoulder of the animal is the thinnest and least firm. In the manufacture of belting in the ordinary manner, when it is desired to make a heavy belt only the thickest parts of the leather can be used, the thinner part being cut off and thrown aside.

The object of my invention is to furnish an improved lap-joint, by the use of which a belt of nearly uniform thickness and strength may be produced, and at the same time the amount of stock used may be economized; and it consists, first, in forming the lap-joint by combining a separate strip of leather with the thinner parts, and with the overlapped ends of the joined parts of the belting, the ends of said piece being laced or riveted or otherwise secured to the body of the belting, as hereinafter more fully described; and, second, in the manner of lacing the overlapping end to the body of the overlapped part of the belting, as hereinafter more fully described.

A and B are the thinner parts of the strips that are to be joined in forming the belting. The extreme ends of these parts are shaved off to a bevel, so that the overlapped portion may be no thicker than the other. Strips are then cut out of the overlapping end of the part B, so as to form laces $b'$ out of the part B itself, as shown in dotted lines in Fig. 2. These laces are then laced into holes formed through the part A, as shown in Figs. 1 and 2.

C is a strip of leather of such a thickness as will make the part of the belting to which it is applied equal in thickness to the thicker parts $a^2$ and $b^2$ of the leather. This piece C may be a piece split from the butt of the same hide from which the belting is being made, or it may be any other strip of leather of the requisite thickness. The ends of the strips C are shaved thin, and strips are cut out of them, so as to form laces $e'$ and $e^2$, which are laced into holes formed in the body of the parts A and B of the belt, as shown in Fig. 1.

The overlapped portions of the belting are still further secured to each other by being cemented in the ordinary manner. The overlapping ends may be secured to the body of the belting by rivets, if desired; or they may be secured in any other convenient manner.

In manufacturing belting according to my improvement, the two thinner ends of two contiguous strips are joined together, and also the two thicker ends. In joining the two thicker ends, as $b^2$ and D, both ends are shaved down thin and overlapped, and strips are cut out of each end, so as to form laces $b^3$ and $d'$, which are laced into holes formed in the body of the ends $b^2$ and D, as shown in Fig. 1. The overlapping ends $b^2$ and D are still further secured to each other by being cemented in the ordinary manner.

The thinner ends of the strips of which the belting is manufactured may be joined to the thicker parts of the adjacent strips, and the strip C made to slightly overlap the thicker part of the one strip and extend along the thinner part of the other strip, as far as may be necessary; but I prefer the manner first described, as making a better belt and a more secure joint.

I claim as new and desire to secure by Letters Patent—

1. The combination of the strip C with the thinner pieces A B of the belting, the ends of said pieces being overlapped and secured to each other, substantially as described, for the purpose specified.

2. The manner of lacing the overlapping end to the overlapped part of the belting, substantially as herein described, and for the purposes set forth.

HENRY UNDERWOOD.

Witnesses:
WM. F. MCNAMARA,
JAMES T. GRAHAM.